(12) United States Patent
Nanni et al.

(10) Patent No.: US 8,055,222 B2
(45) Date of Patent: Nov. 8, 2011

(54) MULTIPLE PROTOCOL SIGNAL DETECTOR

(75) Inventors: Peter Nanni, Algonquin, IL (US); Charles P Binzel, Bristol, WI (US); Christopher N Kurby, Streamwood, IL (US); Brian D Storm, Round Lake Beach, IL (US); Ronald Buskey, Sleepy Hollow, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 448 days.

(21) Appl. No.: 12/335,691

(22) Filed: Dec. 16, 2008

(65) Prior Publication Data

US 2010/0151801 A1    Jun. 17, 2010

(51) Int. Cl.
  *H04H 20/74* (2008.01)
(52) U.S. Cl. .................. 455/188.1; 455/41.2
(58) Field of Classification Search .......... 455/42, 455/63.1, 552.1, 569.1, 41.2, 41.3, 188.1; 375/136, 267, 278
  See application file for complete search history.

(56) References Cited

U.S. PATENT DOCUMENTS

| | | | |
|---|---|---|---|
| 4,435,821 A * | 3/1984 | Ito et al. | 375/137 |
| 4,616,364 A * | 10/1986 | Lee | 375/136 |
| 5,258,981 A | 11/1993 | Davey et al. | |
| 5,555,096 A | 9/1996 | Yoo | |
| 5,812,604 A * | 9/1998 | Herbst et al. | 375/308 |
| 5,974,042 A | 10/1999 | Frank et al. | |
| 6,044,090 A | 3/2000 | Grau et al. | |
| 2004/0203433 A1 | 10/2004 | Najafi et al. | |
| 2005/0085230 A1 | 4/2005 | Welnick et al. | |
| 2005/0227625 A1 | 10/2005 | Diener | |

FOREIGN PATENT DOCUMENTS

| | | |
|---|---|---|
| EP | 0411207 A2 | 2/1991 |
| JP | 2002368829 A | 12/2002 |
| WO | 9302369 A1 | 2/1993 |
| WO | 02078204 A1 | 10/2002 |

* cited by examiner

*Primary Examiner* — Brian Young
(74) *Attorney, Agent, or Firm* — Philip A. Premysler; Sylvia Chen (57) ABSTRACT

A Multiple Protocol Signal Detector, MPSD (320, 500) has a mixer (406) that receives signal energy from a multi-band antenna system (324) via a low noise amplifier (402) and from a variable frequency synthesizer (408) via a first variable band pass filter (410). The output of the mixer (406) passes through a second variable band pass filter (416) to an envelope detector (418) a power detector (419) and a low resolution A/D (420) that inputs digitized samples to a binary modulation detector, BMD (422). A controller (424) configures the aforementioned devices of the MPSD (320) to detect communications using different protocols based on a scan Look Up Table (426).

17 Claims, 6 Drawing Sheets

| 602 | 604 | 606 | 608 | 610 | 612 | 614 | 616 |
|---|---|---|---|---|---|---|---|
| CHANNEL # | VARIABLE FREQUENCY SYNTHESIZER SETTING | 1ST VARIABLE BAND PASS FILTER SETTINGS | SECOND VARIABLE BAND PASS FILTER SETTINGS | ENVELOPE DETECTOR ACTIVE (Y/N) | ENVELOPE DETECTOR SETTINGS | BINARY MODULATION RATE DETECTOR ACTIVE (Y/N) | BINARY MODULATION RATE SETTING |
| 1 | XXXXX | XXXXX | XXXXXX | X | XX XXX XXXX | X | XXXX |

MULTIPLE PROTOCOL SIGNAL DETECTOR

FIELD OF THE INVENTION

The present invention relates generally to pattern recognition of radio signal characteristics by a wireless communication device (also referred to as a "mobile station" or "user equipment") enabled with multiple radio access technologies (RATs) which operate using different communication protocols.

BACKGROUND

The last fifteen years has seen widespread adaptation of cellular telephony systems for wireless wide area networks (WWANs). At present there are believed to be over two billion cellular telephone users globally. Countries, or in some cases supra-national groupings, regulate electromagnetic spectrum usage independently of each other. This means that cellular networks in different parts of the world do not necessarily use the same frequencies. Additionally, competition between different corporations, and in some cases industry groups, have produced different cellular telephony communication protocols such as GSM, CDMA, WCDMA, and iDEN. In some cases, a particular protocol may be used within different carrier frequency bands in different countries. Some cellular telephone handsets (cell phones) are cable of operating in multiple frequency bands for use in different countries.

Furthermore, it is anticipated that more wireless devices that support multiple competing cellular telephony protocols will be developed. To make these wireless communication devices even more useful, manufacturers have added the ability to communicate using one or more shorter-range wireless communication protocols such as WiFi for wireless local area networks (WLANs), WiMax for wireless metropolitan area networks (WMANs), or Bluetooth for wireless personal area networks (WPANs).

A wireless communication device is, of course, meant to be mobile. By design, a wireless communication device's receiver frequently scans for base station signals in its vicinity so that, when a user moves from one cell's coverage to another, the communications link can be handed off seamlessly. Additionally, a user may move out of a zone of service using one RAT into a zone covered using a second RAT, for example an area still using a legacy protocol, and need to scan a large amount of spectrum to find a compatible network. In a similar case, a cell phone may be activated after a user has deplaned in a foreign country, in which case the cell phone methodically scans all frequencies for any RAT it is capable of using. Wireless mobile communication devices may also automatically scan for shorter range communication signals as well as WWAN signals (or instead of WWAN signals). All of the scanning activities occur even if the cell phone is in idle mode (e.g., not in a call), keeping the cell phone's receiver busy, and draining precious battery power. Given the inconvenience of reduced battery life and the increased awareness of the need to conserve energy globally, it would be desirable to be able to reduce the power consumed by scanning activities.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

A wireless handset has a multiple protocol signal detector (MPSD) that includes a mixer that receives radio signals from an antenna system and a reference signal from a frequency synthesizer. The mixer outputs a base band or intermediate frequency signal to a binary modulation detector and/or an envelope detector, which are selectively operated by a controller to detect the presence of communication signals associated with various RATs. A first configurable filter is suitably provided between the frequency synthesizer and the mixer and a second configurable filter is suitably provided at the output of the mixer. The configurable filters can also be operated under the control of the controller. A Look Up Table can include configuration information based upon which the controller configures the aforementioned components of the multiple protocol signal detector. The MPSD is simple enough to be made at low cost and may be more energy efficient than typical main transceivers in performing the limited task of detecting communication signals.

Figure 1:
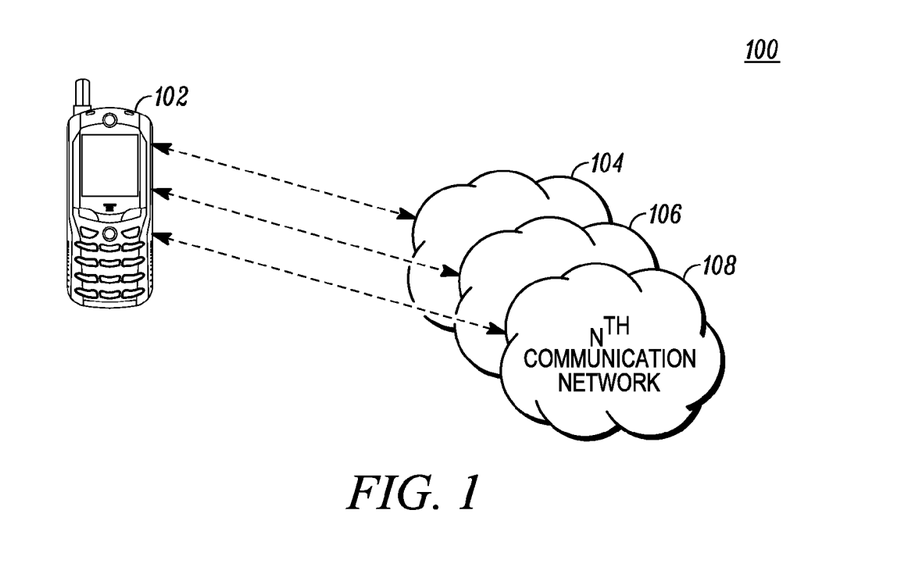
FIG. 1 is a block diagram of a wireless communication environment according to an embodiment of the invention.

FIG. 1 is a block diagram of a wireless communication environment 100 according to an embodiment of the invention. A mobile handset 102 in the environment is able to communicate with a first communication network 104, a second communication network 106, and an $N^{TH}$ communication network 108. The three communication networks 104, 106, 108 are distinguished by their use of different communication protocols such as iDEN, GSM, and CDMA, for example, and the mobile handset 102 is able to communicate using all three RATs. Although only three networks are illustrated, in general there may be any number (including zero) of networks active in a given area. As the mobile handset 102 moves to different locations, unbeknownst to the user the mobile handset will move into and out of regions covered by different networks. Generally, the mobile handset 102 will automatically ascertain the availability of channels for each of the communication protocols it supports. As used herein the term "channel" means an information pathway established using a particular communication protocol (or RAT) at a particular frequency band.

Figure 2:
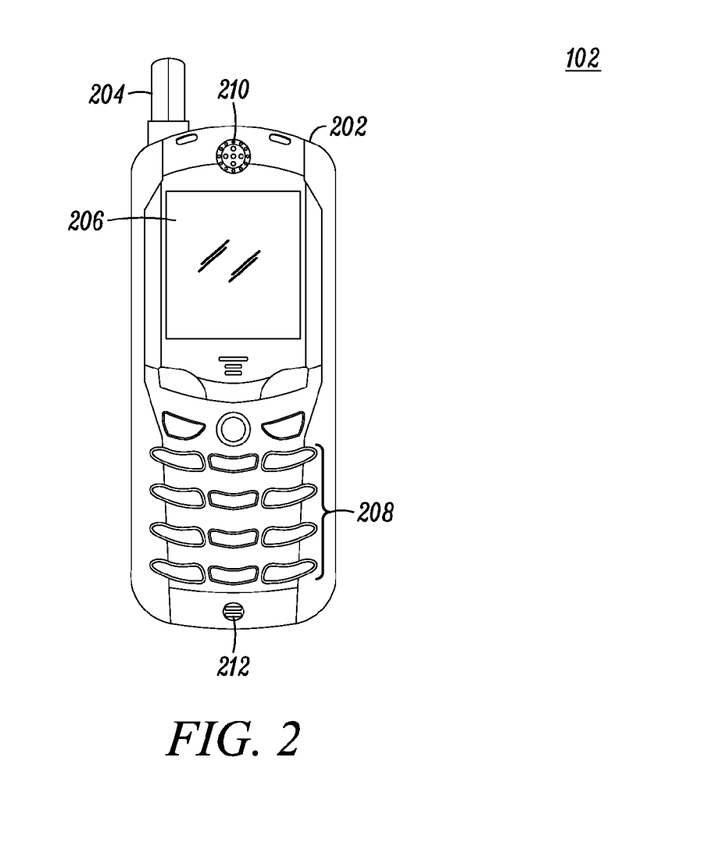
FIG. 2 is a front view of a mobile handset according to an embodiment of the invention.

FIG. 2 is a front view of the mobile handset 102 according to an embodiment of the invention. The handset 102 includes a housing 202 supporting an antenna 204, display 206, keypad 208, speaker 210, and microphone 212. Although a "candy bar" form factor handset 102 is shown in FIG. 2, one skilled in the art will appreciate that the multiple protocol detectors disclosed herein can be incorporated into handsets of different form factors, including foldable styles, slider styles, and rotator styles as well as types with QWERTY keypads, types with touchscreens, and types implemented as a wireless modem, for example.

Figure 3:
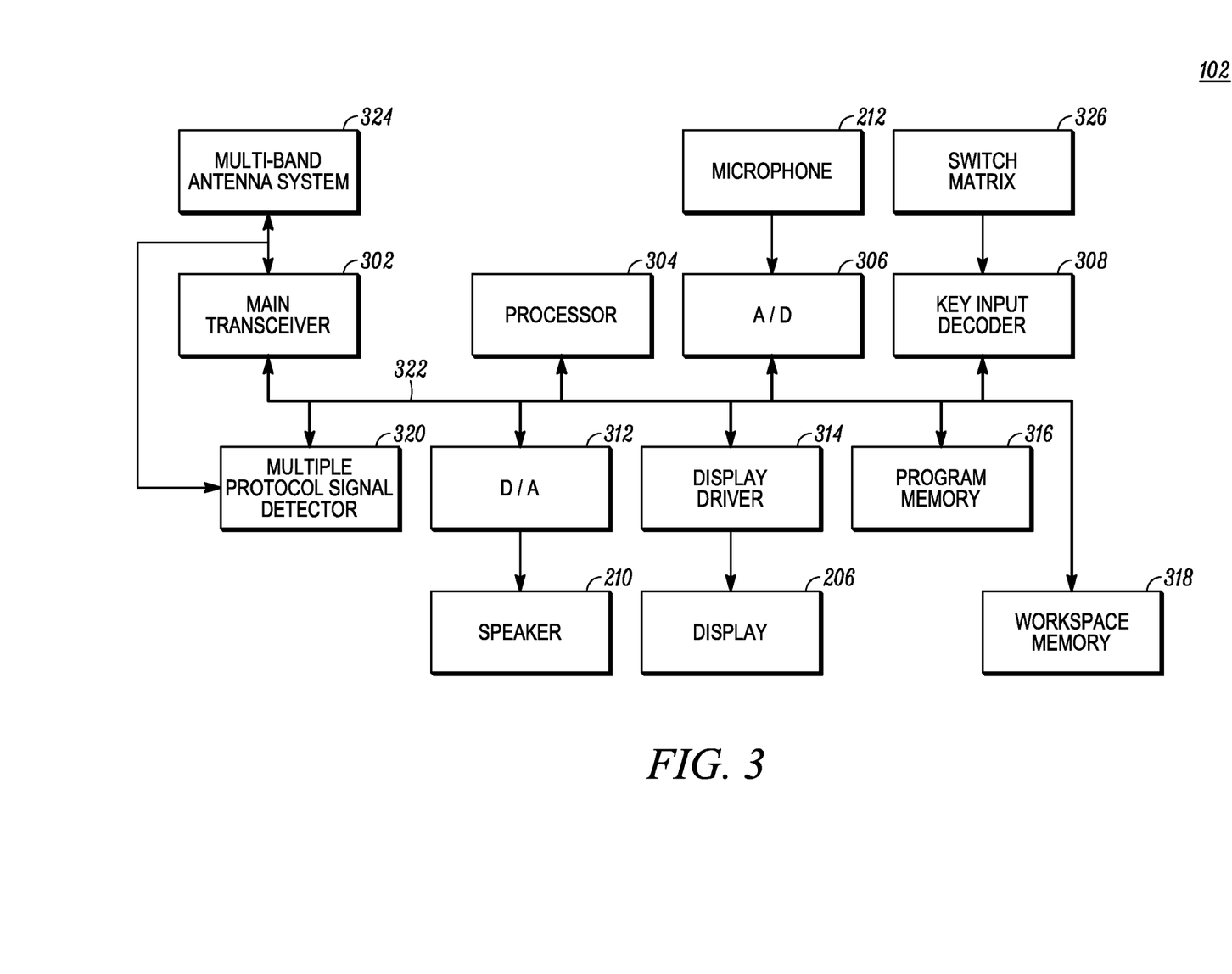
FIG. 3 is a block diagram of the mobile handset shown in FIG. 2 according to an embodiment of the invention.

FIG. 3 is a block diagram of the mobile handset 102 shown in FIG. 2 according to an embodiment of the invention. As shown in FIG. 3, the mobile handset includes a main transceiver module 302, a processor 304 (e.g., a digital signal processor), an Analog-to-Digital converter (A/D) 306, a key input decoder 308, a Digital-to-Analog converter (D/A) 312, a display driver 314, and a program memory 316, a workspace memory 318, and a multiple protocol signal detector (MPSD) 320 coupled together through a digital signal bus 322.

The main transceiver module 302 and the multiple protocol signal detector 320 are coupled to a multi-band antenna system 324 which includes the antenna 204 and may include one or more additional antennas. Internal an/or external antennas may be used. Carrier signals that are modulated with data, e.g., digital data, pass between the antenna system 324, and the main transceiver module 302.

The microphone 212 is coupled to the A/D 306. Audio, including spoken words, is input through the microphone 212 and converted to digital format by the A/D 306.

A switch matrix 326 that is part of the keypad 208 (shown in FIG. 2) is coupled to the key input decoder 308. The key input decoder 308 serves to identify depressed keys and provide information identifying each depressed key to the processor 304.

The D/A 312 is coupled to the speaker 210. The D/A 312 converts decoded digital audio to analog signals and drives the speaker 210. The display driver 314 is coupled to the display 206. The display 206 can show information received wirelessly (e.g., when using the mobile handset 102 to access an internet or intranet) and also status information regarding the mobile handset 102 itself (e.g., available networks, available battery power, etc.).

The multiple protocol signal detector (MPSD) 320, which will be described below, provides information to the processor 304 as to the availability of communication channels using a variety of different protocols.

The program memory 316 is used to store programs that control the mobile handset 102. The programs stored in the program memory 316 are executed by the processor 304. The workspace memory 318 is used as a workspace by the processor 304 in executing programs. The program memory 316 is a form of computer readable media. Other forms of computer readable media can alternatively be used to store programs that are executed by the processor 304.

Figure 4:
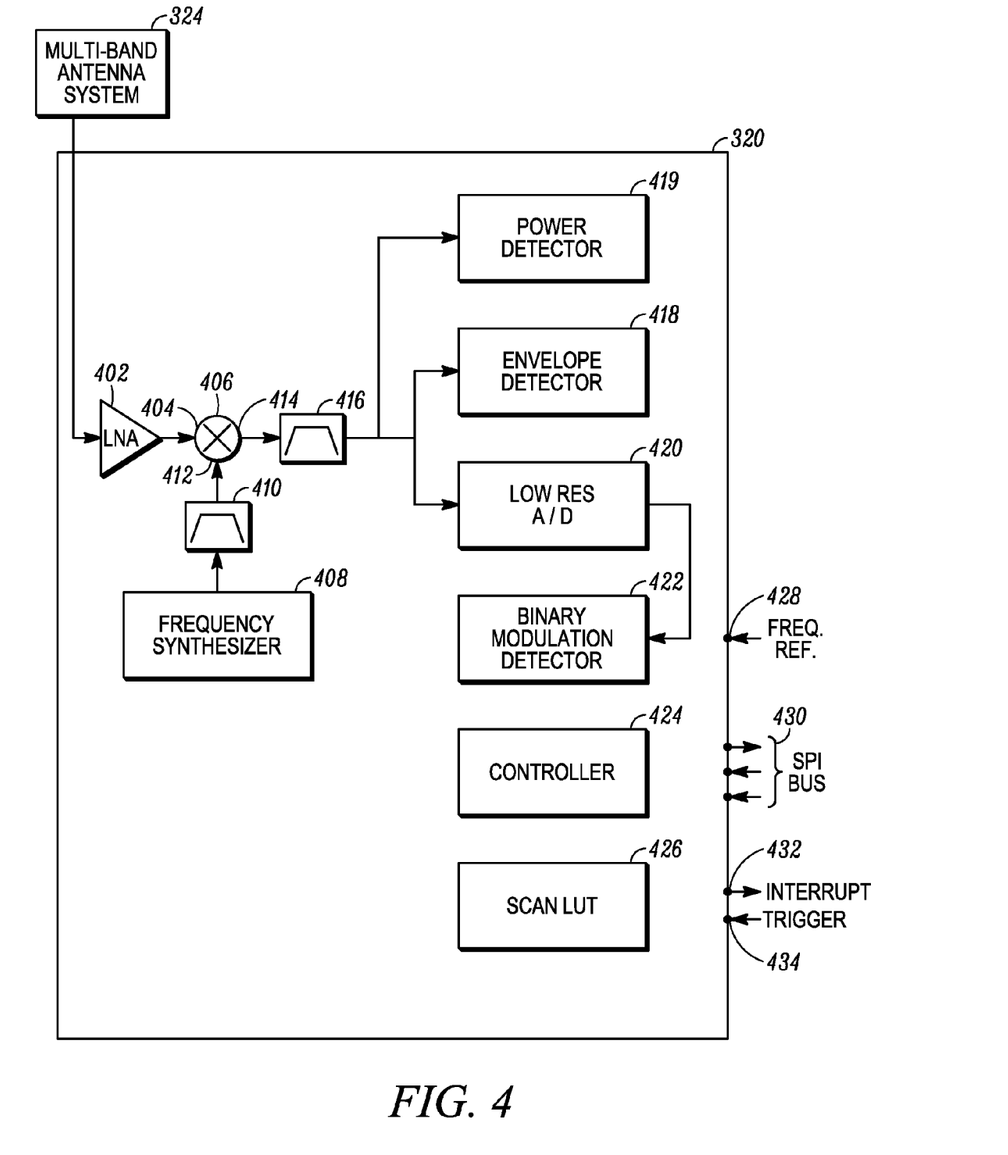
FIG. 4 is a block diagram of a multiple protocol signal detector used in the handset shown in FIGS. 2-3.

FIG. 4 is a block diagram of the MPSD 320 used in the handset 102 shown in FIGS. 2-3. As shown in FIG. 4, the multi-band antenna system 324 is coupled through a low noise amplifier 402 of the MPSD 320 to a first input port 404 of a mixer 406. A variable frequency synthesizer 408 is coupled through a first variable band pass filter 410 to a second input port 412 of the mixer 406. An output port 414 of the mixer 406 is coupled through a second variable band pass filter 416 to a power detector 419, an envelope detector 418 and a low resolution Analog-to-Digital converter (A/D) 420. The first and second variable band pass filters 410, 416 may include filter banks that can be switched in and out of signal pathways and/or electronically variable active components. The low resolution A/D converter 420 can represent signal samples using less than 8 bits, for example 4 bits.

The power detector 419 is used to perform fast checks for any signal activity in a frequency band that is determined by settings of the frequency synthesizer 408, the first variable band pass filter 410, and the second variable band pass filter 416.

The envelope detector 418 is used in multiple different ways to identify certain types of protocols. The simplest way to use the envelope detector 418 is to tune the variable frequency synthesizer 408, the first variable band pass filter 410, and the second variable band filter 416 to the appropriate settings for a particular frequency band for a particular protocol and use the envelope detector 418 as an energy detector. If the energy exceeds a preset threshold, the channel in question is marked as detected. A more sophisticated way to use the envelope detector 418 is to analyze the detected envelope to determine if it has frequency components that are known to be associated with signals of a given protocol, for example a frequency component corresponding to a signaling rate for the given protocol. A discrete time domain filtering technique such as Discrete Time Fourier Transform (DTFT), Finite Impulse Response (FIR), or Infinite Impulse Response (IIR) filtering can be used for this purpose. Such filters are suitably incorporated into the envelope detector 418, along with a threshold detector that detects whether the output of the filter exceeds a predetermined threshold. The filters can be run at different rates appropriate for different protocols.

The low resolution A/D 420 is coupled to a Binary Modulation Detector (BMD) 422. The BMD is used to detect a digital modulation that is characteristic of signals of a particular protocol to be detected. One example of a binary modulation detector is a chip rate detector which is capable of detecting and discriminating the presence of a direct sequence spread spectrum (e.g., CDMA) with a particular chip rate. One suitable direct sequence spread spectrum signal detector is taught in U.S. Pat. No. 5,974,042 to Frank et al. In broad outline, this detector works by summing the correlation of a chip rate clock signal and an autocorrelation of a received signal over a number of chip cycles. Such a binary modulation detector can also be applied to other types of digital wireless communication signals by using a clock signal corresponding to a binary modulation rate in lieu of the chip rate clock signal.

A controller 424 controls the operation of the above described components of the MPSD 320 in accordance with information stored in a Look Up Table (LUT) 426 and read by the controller 424. In particular, the controller 424 controls tuning of the variable frequency synthesizer 408, first variable band pass filter 410, and second variable pass filter 416. The LUT 426 suitably has a record for each channel of each protocol that the MPSD 320 will seek to identify. Each record suitably includes a field for each component (e.g., 408, 410, 416) that is to be configured by the controller 424. Each field can have a set of binary flags indicating configuration switch positions. The controller 424 can read the binary flags and set switches accordingly in order to configure the variable frequency synthesizer 408, first variable band pass filter 410, and second variable band pass filter 416 (and optionally other components of the MPSD 320) accordingly.

Figure 6:
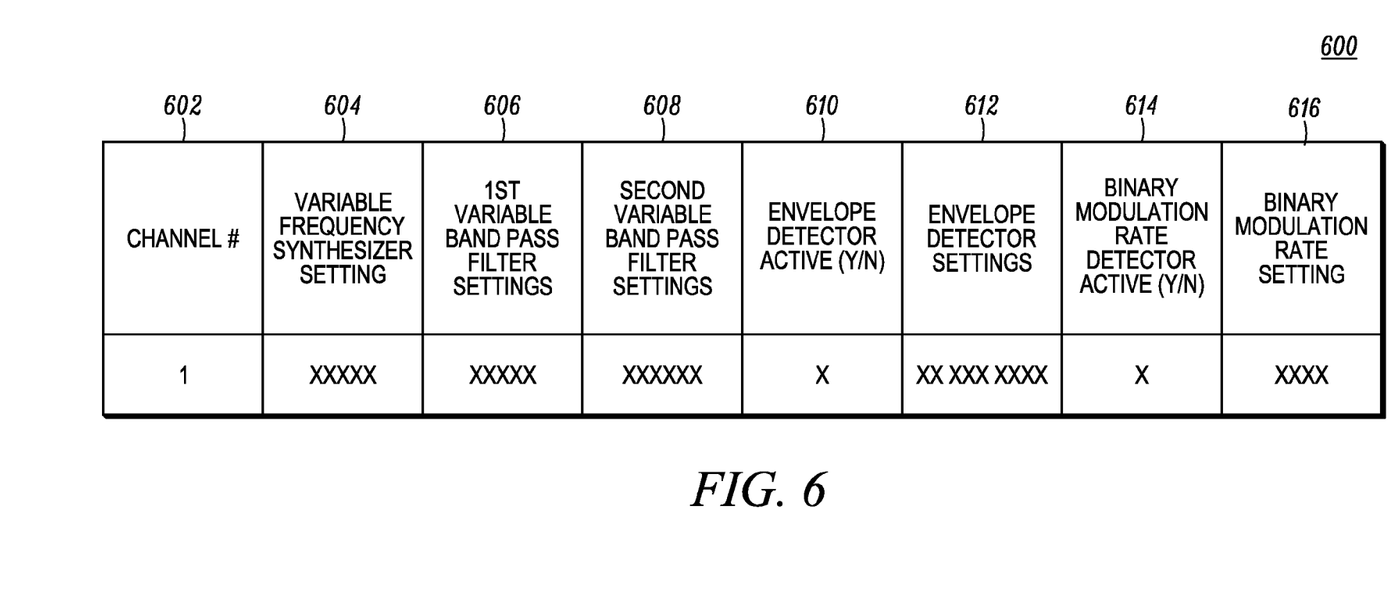
FIG. 6 illustrates an example of a record format of a scan Look Up Table used to self-configure the multiple protocol signal detector shown in FIG. 4 according to an embodiment of the invention.

Turning momentarily to FIG. 6, FIG. 6 illustrates an example of a record format 600 of the scan LUT 426 used to self-configure the multiple protocol signal detector shown in FIG. 4 according to an embodiment of the invention. As shown in FIG. 6, a record 600 within the scan LUT 426 includes a channel number column 602, a variable frequency synthesizer 408 setting column 604, a first variable band pass filter 410 setting column 606, a second variable band pass filter 416 setting column 608, an envelope detector 418 activation flag column 610, an envelope detector setting (e.g., sampling rate, filter coefficients, and detection threshold) column 612, a BMD 422 activation flag column 614, and binary modulation detector setting (e.g., a channel bit rate or a CDMA chip rate ) column 616. Dummy data for only a first channel is shown for illustration.

Returning to FIG. 4, the MPSD 320 has a frequency reference port 428, a set of SPI bus ports 430, an outgoing interrupt port 432, and an incoming trigger port 434—all of which are suitably coupled to the digital signal bus 322 (shown in FIG. 3) of the mobile handset 102. The frequency reference port 428 allows an accurate frequency reference signal to be input. The set of SPI ports 430 can be used to configure the MPSD 320 and to initiate and terminate operation. For example, the MPSD 320 can be configured to search using only a subset of the records in the LUT 426 via the set of SPI bus ports 430. The interrupt port 432 can be used to set an interrupt of the processor 304 of the handset 102 so that the processor 304 can then read the results of the scan from the controller 424. The trigger port 434 can be used to initiate scanning by the MPSD 320 without using the SPI bus ports 430.

Figure 7:
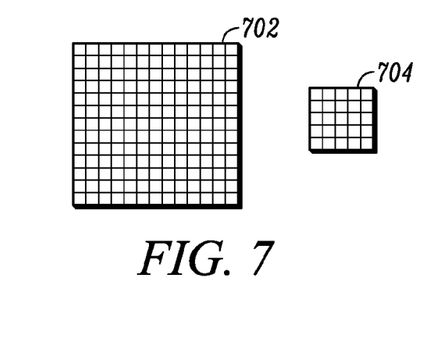
FIG. 7 shows the relative semiconductor die areas of a main transceiver and the multiple protocol signal detector shown in FIG. 4 according to an embodiment of the invention.

Because the MPSD 320 is only used to detect signals and not to decode information, its components can be designed with an eye toward reducing power consumption as opposed to achieving an optimum sensitivity. The MPSD 320 preferably consumes on average less than 60% of the average amount of energy required by the main transceiver to detect a channel, and more preferably less than 40% of the energy. The MPSD 320 can be implemented using less than $1/8^{th}$ of the semiconductor die area needed to implement the main multi-RAT transceiver module 302 and thus the cost added to the handset by the MPSD is acceptably low. In FIG. 7, a first semiconductor die area 702 of the main transceiver 302 is shown juxtaposed with a second semiconductor die area 704 for the MPSD 320 for comparison. The relatively small die area of the MPSD results in a lower cost for the MPSD 320.

Figure 5:
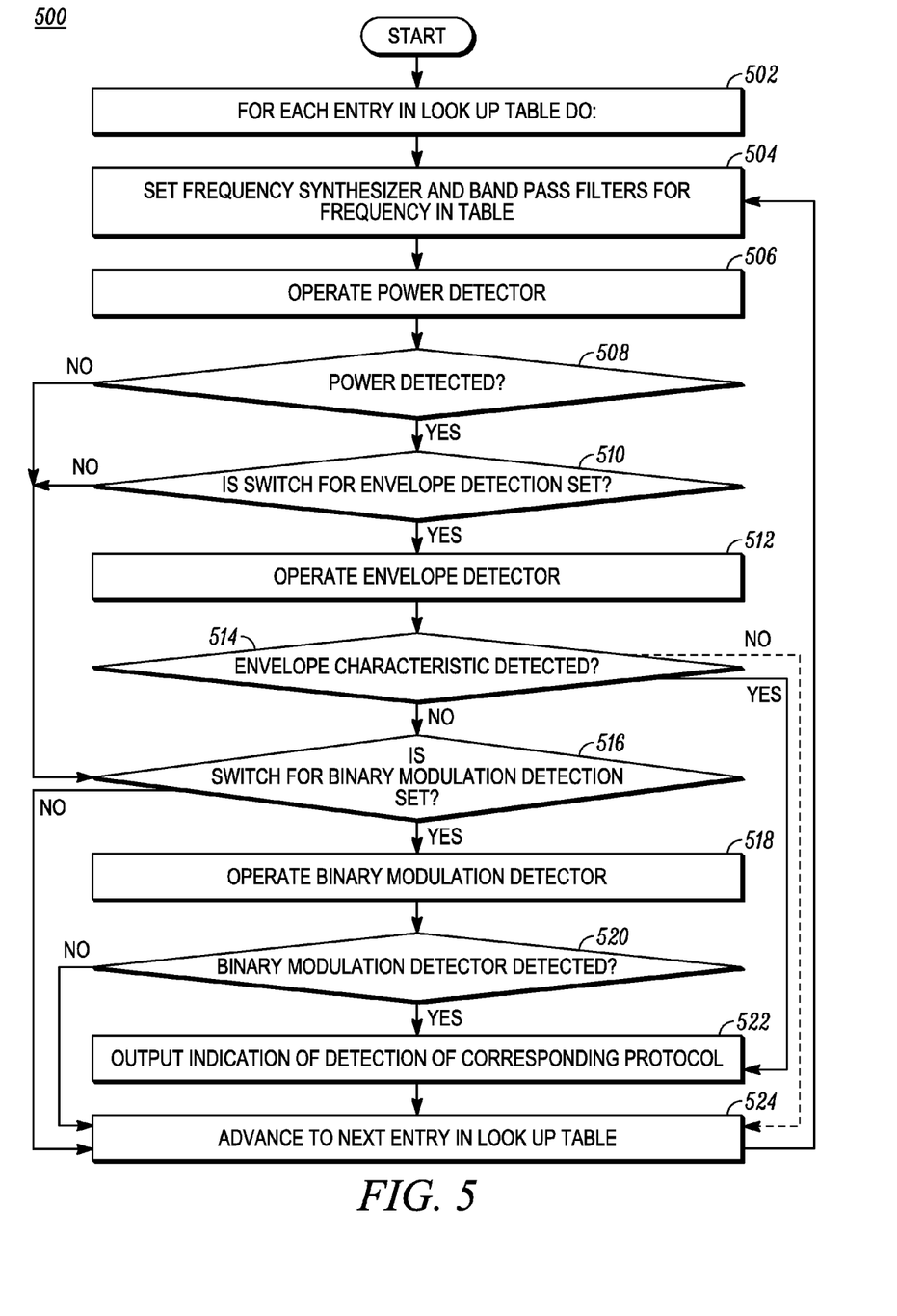
FIG. 5 is a flowchart of a method of operating the multiple protocol signal detector according to an embodiment of the invention.

FIG. 5 is a flowchart 500 of a method of operating the MPSD 320 in order to search for radio signals according to an embodiment of the invention. Block 502 is the top of a program loop that runs through the records in the LUT 426 of the MPSD 320. In block 504 the frequency of the variable frequency synthesizer 408 and the pass bands of the variable band pass filters 410, 416 are set in accordance with a record of the LUT 426 currently being accessed. Next in block 506 the power detector 419 is operated to check for any signals in a frequency band determined by the settings established in block 504. Block 508 is a decision block, the outcome of which depends on whether power is detected. If no power is detected then the method branches to block 516 described below. If power is detected then the flowchart 500 proceeds to decision block 510, the outcome of which depends on whether a record of the LUT 426 currently being processed indicates that the envelope detector 418 should be operated. If the outcome of block 510 is positive, the flowchart 500 continues to block 512 in which the envelope detector 418 is operated according to settings read from the LUT 426. Next, decision block 514 tests if the envelope detector 418 has detected a radio signal envelope having prescribed characteristics corresponding to the settings of the envelope detector as read from the LUT 426. If the outcome of decision block 514 is positive, then in block 522 an indication that a specific radio signal (corresponding to the entry of the LUT being processed) is output. The indication can be output using the SPI bus 430 and/or the interrupt 432.

If power was not detected or the envelope characteristic was not detected, or if no envelope detection was called for (i.e., if the outcomes of blocks 508, 510, and 514 are negative) the flowchart branches to decision block 516 which tests if a switch in the LUT 426 calling for operation of the BMD 422 is set. If so, then in block 518 the BMD 422 is operated according to settings stored in the LUT 426 in order to try to detect a signal. The outcome of decision block 520 depends on whether the BMD 422 has detected a signal. If so, then in block 522 an indication that a radio signal of a type associated with the current record of the LUT 426 is output. Thereafter, block 524 advances the search for radio signals to the next entry in the LUT 426.

According to an alternative embodiment of the invention, both the envelope detector 418 and the BMD 422 can be operated concurrently and the output of the two can be combined with a Boolean operator, e.g., AND or OR. Information stored in an additional column of the LUT 426 can be used to control whether Boolean AND or Boolean OR is used to combine the output of the envelope detector 418 and the BMD 422. Alternatively, fuzzy logic operators can be used in lieu of Boolean operators.

Figure 8:
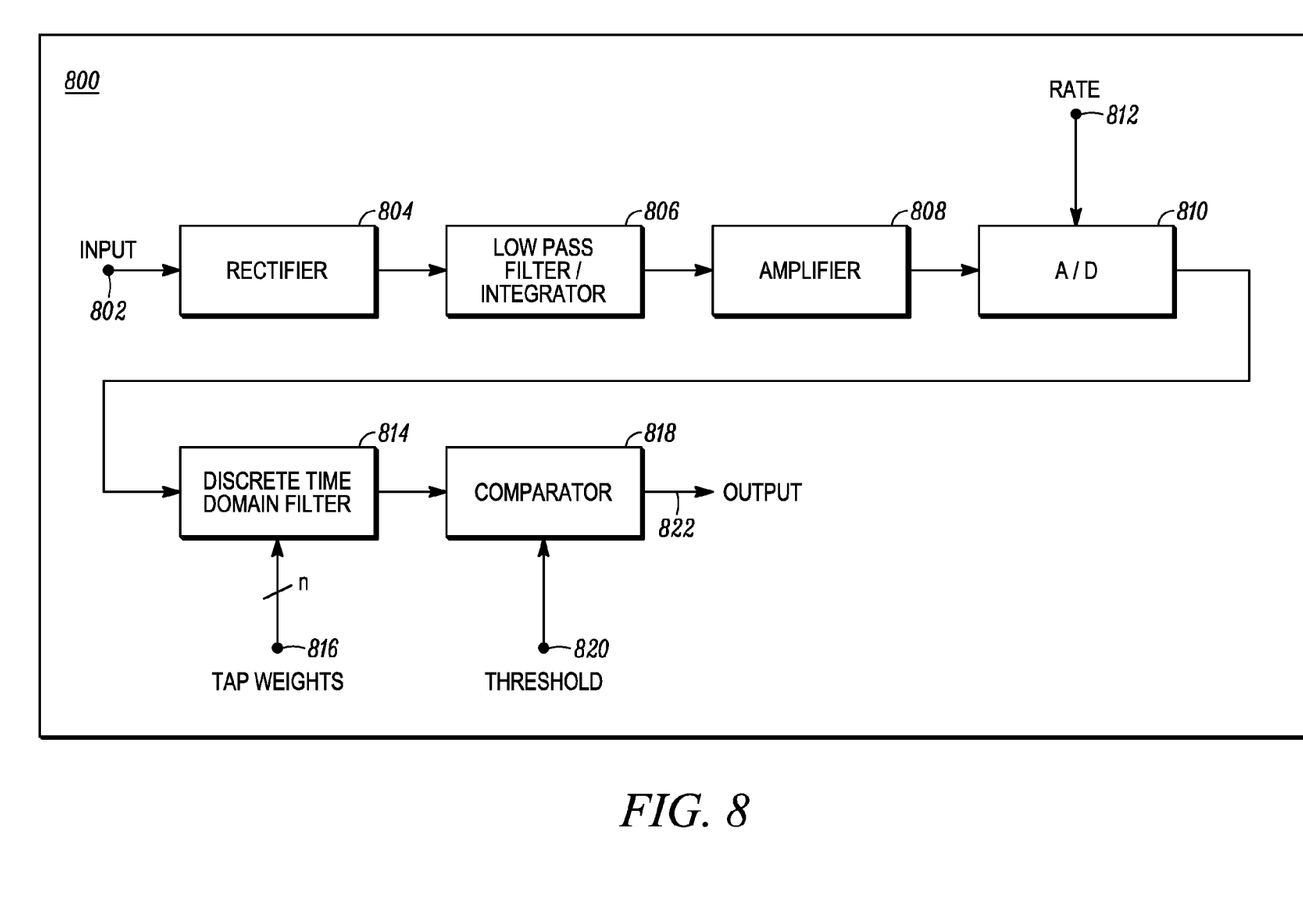
FIG. 8 shows an envelope detector according to an embodiment of the invention.

Referring to FIG. 8 the internal design of an envelope detector 800 according an embodiment of the invention will be described. The envelope detector 800 shown in FIG. 8 can be used as the envelope detector 418 of the MPSD 320. As shown in FIG. 8, an input 802 of a rectifier 804 serves as the input of the envelope detector 800. The rectifier 804 is coupled to a low pass filter/integrator 806. The low pass filter/integrator 806 is coupled through an amplifier 808 to an Analog-to-Digital converter (A/D) 810. The A/D converter 810 has a rate control input 812 which determines the rate at which the A/D converter samples the amplified envelope signal received from the amplifier 808. The rate control input 812 receives information from the envelope detector setting column 612 of the LUT 426. The A/D converter 810 is coupled to a Discrete Time Domain Filter (DTDF) 814 (e.g., DTFT, FIR, IIR). The DTDF 814 has a set of tap weight inputs 816 that also receive information from the envelope detector setting column 612 of the LUT 426. The DTDF outputs a filtered envelope signal. The DTDF 814 is coupled to a comparator 818. The comparator 818 has a threshold input 820 which also receives input derived from data in the envelope detector setting column 612 of the LUT 426. An output 822 of the comparator 818 serves as an output of the envelope detector 800. The envelope detector 800 shown in FIG. 8 can be configured by supplying appropriate data to the rate input 812 of the A/D converter 810, the tap weight inputs 816 of the DTDF 814, and threshold input 820 of the comparator 818 to detect a variety of types of radio communication signals. In the MPSD 320 the rate input 812, the tap weight inputs 816, and the threshold input 820 are coupled to the controller 424 so that the controller can apply control signals to these inputs based on data read from the scan LUT 426.

It should be observed that the embodiments reside primarily in combinations of method steps and apparatus components related to cellular telephony. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second and the like may be used solely to distinguish one entity from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element It will be appreciated that embodiments of the invention described herein may be comprised of one or more conventional processors and unique stored program instructions that control the one or more processors to implement, in conjunction with certain non-processor circuits, some, most, or all of the functions of cellular telephony described herein. The non-processor circuits may include, but are not limited to, a radio receiver, a radio transmitter, signal drivers, clock circuits, power source circuits, and user input devices. As such, these functions may be interpreted as steps of a method to perform cellular telephony. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A wireless handset comprising:
a multiple protocol signal detector with:
a mixer having a first input port, a second input port, and an output port;
a multi-band antenna system coupled to said first input port;
a frequency synthesizer coupled to said second input port;
an envelope detector coupled to said output port of said mixer;
a binary modulation detector coupled to said output port of said mixer; and
a controller adapted to selectively operate said envelope detector and said binary modulation detector for each of a plurality of frequency bands, wherein said controller is adapted to read information stored in a Look Up Table and to selectively operate said envelope detector and said binary modulation detector based on said information stored in said Look Up Table.

2. The wireless handset according to claim 1 wherein said binary modulation detector comprises:
a direct sequence spread spectrum signal detector.

3. The wireless handset according to claim 2 wherein said binary modulation detector comprises:
a CDMA signal detector.

4. The wireless handset according to claim 1 wherein said multiple protocol signal detector further comprises:
a first variable band pass filter coupled between said frequency synthesizer and said mixer.

5. The wireless handset according to claim 4 wherein said multiple protocol signal detector further comprises:
a second variable band pass filter coupled between said mixer and said envelope detector and also between said mixer and said binary modulation detector.

6. The wireless handset according to claim 1 wherein said multiple protocol signal detector further comprises:
a power detector and wherein operation of said envelope detector and operation of said binary modulation detector are conditioned on detection of power by said power detector.

7. The wireless handset according to claim 1 further comprising:
an analog-to-digital converter coupled between said output port of said mixer and said binary modulation detector.

8. The wireless handset according to claim 7 wherein said analog-to-digital converter has a resolution of less than 8 bits.

9. The wireless handset according to claim 1 further comprising:
a main transceiver, and wherein the multiple protocol signal detector consumes, on average, less than 60% of an average amount of energy required by the main transceiver to detect a signal.

10. The wireless handset according to claim 9 wherein the multiple protocol signal detector consumes, on average, less than 40% of an average amount of energy required by the main transceiver to detect said signal.

11. The wireless handset according to claim 1 further comprising:
a main transceiver, and wherein the multiple protocol signal detector is implemented using less than 1/8th of a semiconductor die area used to implement said main transceiver.

12. The wireless handset according to claim 1 wherein said envelope detector comprises:
a rectifier;
a low pass filter coupled to said rectifier;
an A/D coupled to said low pass filter, said A/D having a rate control input coupled to said controller;
a discrete time domain filter with tap weight inputs coupled to said controller; and
a comparator, coupled to said discrete time domain filter, having a threshold input coupled to said controller.

13. The wireless handset according to claim 12 further comprising an amplifier interposed between said low pass filter and said A/D.

14. A method of operating a wireless handset comprising:
for each particular frequency band of a plurality of frequency bands supporting a plurality of communication protocols:

selectively operating a binary modulation detector and selectively operating an envelope detector based on stored information for said particular frequency band; and if said binary modulation detector detects a binary modulation rate of a first communication protocol associated with said particular frequency band, outputting an indication of detection of a first communication channel; and if said envelope detector detects a second communication protocol associated with said particular frequency band, outputting an indication of detection of a second communication channel.

15. The method according to claim 14 further comprising:

prior to operating said binary modulation detector and prior to operating said envelope detector, operating a power detector and conditioning operation of said binary modulation detector and said envelope detector on detection of power by said power detector.

16. The method according to claim 14 wherein selectively operating said binary modulation detector comprises operating said binary modulation detector to detect binary modulation at three different rates associated with three different communication protocols.

17. The method according to claim 14 wherein operating said envelope detector based on stored information comprises:

sampling an envelope signal, applying a filter to said envelope signal to produce a filtered envelope signal, and comparing said filtered envelope signal to a threshold.

* * * * *